United States Patent
Nolan et al.

(10) Patent No.: US 6,412,068 B1
(45) Date of Patent: Jun. 25, 2002

(54) CARD MANAGEMENT BUS AND METHOD

(75) Inventors: Shari J. Nolan, San Jose; Alan R. Merrell, Fremont; Michael G. Panas, Hayward; Alastair Taylor, San Jose, all of CA (US); Craig McDermott, Cedar Rapids, IA (US); Oliver C. Field, III, San Jose, CA (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 09/348,422

(22) Filed: Jul. 7, 1999

(51) Int. Cl.⁷ .............................................. G06F 13/00
(52) U.S. Cl. .............................................. 713/1; 710/1
(58) Field of Search ........................... 713/1; 709/213, 709/214, 217, 219, 220, 222; 710/1, 8, 10

(56) References Cited

U.S. PATENT DOCUMENTS

| | | | | |
|---|---|---|---|---|
| 5,170,472 A | * | 12/1992 | Cwiakala et al. | 710/8 |
| 5,272,584 A | | 12/1993 | Austruy et al. | 361/58 |
| 6,085,276 A | * | 7/2000 | Van Doren et al. | 710/240 |
| 6,173,341 B1 | * | 1/2001 | Emerson et al. | 710/8 |

* cited by examiner

Primary Examiner—Thomas M. Heckler
(74) Attorney, Agent, or Firm—Stephen A. Terrile; Hamilton & Terrile, LLP

(57) ABSTRACT

A card management system architecture for managed startup of a system and for monitoring its operation is provided. Both a method and device particularly suited to carrying out the method are provided. According to one embodiment of the method, a second controller evaluates the status of power supplies and then powers up a first controller and processors on input-output processors (IOPs). The first controller evaluates the status of individual IOPs and enables additional power and data interfaces. Additional embodiments involve additional structures and steps. Redundant channels for communications among controllers and IOPs are preferred. In one embodiment, the first bus is implemented as five serial communication lines. Communication between redundant first controllers and between redundant second controllers allows determination of which controllers should be active. Determining which controllers are active may depend on whether the same controllers are in the system as had been in the system during the last proper operation of the system. Enabling a supply of power may depend on whether two or more power supplies are available. Availability of power supplies cooled by fans may depend on whether AC power is available and within appropriate voltage ranges, what the operating temperature is for the power supplies and the speed and status of the cooling fans.

34 Claims, 13 Drawing Sheets

| Byte 0 | | | | | Byte 5 | Byte 6 | Byte N + 6 |
|---|---|---|---|---|---|---|---|
| DST (Bit9 on) 410 | SRC 415 | CMD 420 | STATUS 425 | COUNT 430 | CRC$_0$ 435 | DATA[N] 440 | CRC$_1$ 445 |

DST            Destination

SRC            Source

CMD           Request / response code

STATUS      Packet status flags

COUNT       Number of data bytes
(0 for no data, which also removes CRC$_1$)

CRC$_0$          CRC of header (SRC, DST, CMD, STATUS and COUNT)

DATA [COUNT]    Command / response data

CRC$_1$          Cyclic Redundancy Check on DATA bytes
(not present if there is not data).

FIG. 5A

| Bit 7 | | | | | | | Bit 0 |
|---|---|---|---|---|---|---|---|
| (reserved) 450 | (reserved) 455 | DATA AVAIL 460 | CMD AVAIL 465 | MIPS DST 470 | MIPS SRC 475 | ACK/ NAK 480 | CMD/ RSP 485 |

| | |
|---|---|
| CMD/RSP | Set to one if packet is a command, zero if it is a response |
| ACK/NAK | For response packets, set to one if packet is an ACK (in which case DATA is the response data) or set to zero if packet is a NAK, in which case DATA is the NAK reason code (see the following section). For command packets, this bit is reserved and must be set to zero. |
| MIPS SRC | Set to one if the header SRC address refers to the MIPS CPU in that slot (e.g., responses should be forwarded all the way to the MIPS). Set to zero if the AVR in SRC slot originated the packet. |
| MIPS DST | Set to one if the header DST address refers to the MIPS CPU in that slot. Set to zero if the AVR in DST slot is the target of the packet. If this bit is set in a command packet, it means that the packet should be forwarded all the way to the destination MIPS, as an "unsolicited" packet. If this bit is set in a response, it merely means that the response is answering a command whose MIPS SRC bit was set (i.e., the MIPS receiving the response should be expecting it). |
| CMD AVAIL | For status polling, set to one in a response packet to indicate that the slave AVR has data waiting to send, otherwise set to zero. For request packets, this bit must be zero. |
| DATA AVAIL | For status polling, set to one in a response packet to indicate that the slave AVR has a command waiting to send, otherwise set to zero. For request packets, this bit must be zero. |

FIG. 5B

| Command | Source | Destination | Action |
|---|---|---|---|
| Status Poll | Master | Any Slave | Reply with Status byte |
| Get Command | Master | Any Slave | Get 3rd party command |
| Get Data | Master | Any Slave | Get 3rd party data |
| | | | |
| Get Board Info | MIPS | CMA | Returns board type, slot ID, boot type & HBC master. Disables unsolicited sends from CMA to MIPS CPU |
| Enable Unsolicited | MIPS | CMA | Enables unsolicited sends from CMA to MIPS, and read CMA's current IOP slot polling results |
| | | | |
| Power On | Master | Slave IOP | Turn on power to Board(MIPS) |
| Power Off | Master | Slave IOP | Turn off power to Board(MIPS) |
| PCI Enable | Master | Slave IOP | Enable PCI Bus/Board I/F (Galileo) |
| PCI Disable | Master | Slave IOP | Disable PCI Access |
| Reset CPU | Master | Slave IOP | Reset MIPS chip |
| NMI CPU | Master | Slave IOP | Generate NMI to MIPS chip |
| SPI Reset Enable | MIPS | CMA | Enables HBC MIPS control of SPI reset lines, for programming Atmel microcontrollers (CMAs) |
| Change HBC Master | MIPS | EVC | Requests that EVC change HBC Master line to select specified HBC slot as master (used when HBC is going to drop out, e.g., for hot swap) |
| | | | |
| Get Last Value | Master | Depends on T and N | Return last recorded value for the Nth monitor of variable T |
| Read Parameter | Master | F(T,N) | Same as above but make the measurement now |
| Set Fan Speed | Master | EVC | Set fan F speed to V |
| Set Threshold | Master | EVC | Set temperature threshold to TV for Sensor TN |
| Set Serial Number | Master | Any Slave | Set System Serial No. in EEPROM to SN |
| Set Version No. | Master | Any Slave | Set Version No. in EEPROM to VN |
| DDM Message | MIPS | MIPS | An "envelope" packet for forwarding messages from one MIPS CPU to another |
| DDH Command | MIPS | DDH | Send a command to a Disk Drive Hub |
| DDH Status | MIPS | DDH | Request status from a Disk Drive Hub |

FIG. 6A

```
DETERMINE MASTER HBC
IF MASTER_HBC
THEN
MASTER:
        FOREVER
        DO
                Check for REQUEST from CPU
                IF REQUEST is present
                THEN
                        Execute REQUEST
                        SEND RESPONSE to CPU
                ENDIF
                POLL IOP's
                GET RESPONSE FROM IOP's
                IF CONFIGURATION_CHANGE
                THEN
                        NOTIFY CPU THRU' maskable IRQ
                ELSE
        DONE
ELSE
        FOREVER
        DO
                MONITOR CMB
                IF NO ACTIVITY FOR 'N' seconds
                THEN
                        GOTO MASTER
                DONE
        DONE
ENDIF
```

FIG. 6B

```
FOREVER
DO
        Check for REQUEST from CPU
        IF REQUEST is present
        THEN
                Execute REQUEST
                SEND RESPONSE to CPU
        ENDIF
        Check for REQUEST from MASTER HBC
        IF REQUEST is present
        THEN
                Execute REQUEST
                SEND RESPONSE to HBC
        ENDIF
DONE
```

FIG. 7

CARD MANAGEMENT BUS AND METHOD

BACKGROUND OF THE INVENTION

1. Field of the Invention

This invention relates to the field of mass storage systems. In particular, the invention relates to the management of input-output processors and other cards populating a file server for a mass storage system.

2. Description of the Related Art

The storage of large amounts of data in so-called mass storage systems is becoming a common practice. Mass storage systems typically include storage devices coupled to file servers on data networks. As the amount of storage has increased, the number of file servers in networks has grown, and the concept of a storage area network (SAN) has arisen. Storage area networks connect a number of mass storage systems in a communication network which is optimized for storage transactions. The file servers that manage SANs control many storage devices.

Numerous users in a network communicate with the file servers in a mass storage system for access to data. They depend on nearly continuous access to data, excepting scheduled interruptions. Techniques for managing startup of file servers which utilize redundant controllers and storage devices and techniques for monitoring the operational status of file srver components have become increasingly important. These techniques contribute to reliable access to data without unscheduled interruption of user access.

SUMMARY OF THE INVENTION

The present invention provides a card management system architecture for managed startup of a system and for monitoring its operation. Both a method and device particularly suited to carrying out the method are provided.

According to one embodiment of the method, a second controller evaluates the status of power supplies and then powers up a first controller and processors on input-output processors (IOPs). The first controller evaluates the status of individual IOPs and enables additional power and data interfaces.

Additional embodiments involve additional structures and steps. Redundant channels for communications among controllers and IOPs are preferred. In one embodiment, the first bus is implemented as five serial communication lines. Communication between redundant first controllers and between redundant second controllers allows determination of which controllers should be active. Determining which controllers are active may depend on whether the same controllers are in the system as had been in the system during the last proper operation of the system. Enabling a supply of power may depend on whether two or more power supplies are available. Availability of power supplies cooled by fans may depend on whether AC power is available and within appropriate voltage ranges, what the operating temperature is for the power supplies and the speed and status of the cooling fans.

The evaluation of the status of individual IOPs may involve sending messages to particular addresses where IOPs are potentially located and evaluating a response or non response from each particular address. The messages for communication may be in a fixed format. In one preferred embodiment, the fixed format consists of eight fields. The status of the system may be output for display.

The device particularly suited to carrying out the claimed method includes first and second busses, a controller coupled to the first bus, IOPs each including a first processor, a second processor and a bus access switch, and logic for the controller to communicate with the IOPs across the first bus. Additional embodiments of the device add redundant channels for communication across the first bus, which may include five lines for serial communication. The second bus may be a parallel data bit bus, compliant with the peripheral component interconnect (PCI) standard. The IOPs may also include a power control switch which controls power to second processors and other components on IOPs, which is operated in response to messages from the first controller. The first controller may use a fixed message format including eight fields. The first controller may function by sending messages to particular addresses where IOPs are potentially located and then evaluating the responses or non-responses to determine the status of IOPs. The first processors may be able to signal a processor reset or a non-maskable interrupt to the second processors, in response to messages received from the first controller.

In one embodiment of the present invention, the first processors may have an additional power supply which functions without dependance on messages from the first controller. The first processors may each be coupled to a power switch which the first processor operates in response to messages from the first controller, or in the case of the first processor on the first controller, in response to messages from the second controller. The power switch controls the supply of power to certain components of the IOPs, including the second processors and the bus access switch.

In an embodiment of the present invention, there may be redundant first controllers and redundant second controllers. The redundant controllers may communicate and be equipped with logic that enables them to determine which controllers should be active and which should be passive.

BRIEF DESCRIPTION OF THE FIGURES

FIG. 5A is a message format that can be used in a card management system.

FIG. 5B is a status field format that can be used in a card management system.

FIGS. 6A and 6B are particular messages that a controller in a card management system may send to input-output processors and a protocol that a controller may follow for interfacing with a bus in a card management system.

FIGS. 7 is a protocol that an IOP may follow for interfacing with a bus in a card management system.

DETAILED DESCRIPTION

Overview

Figure 1:
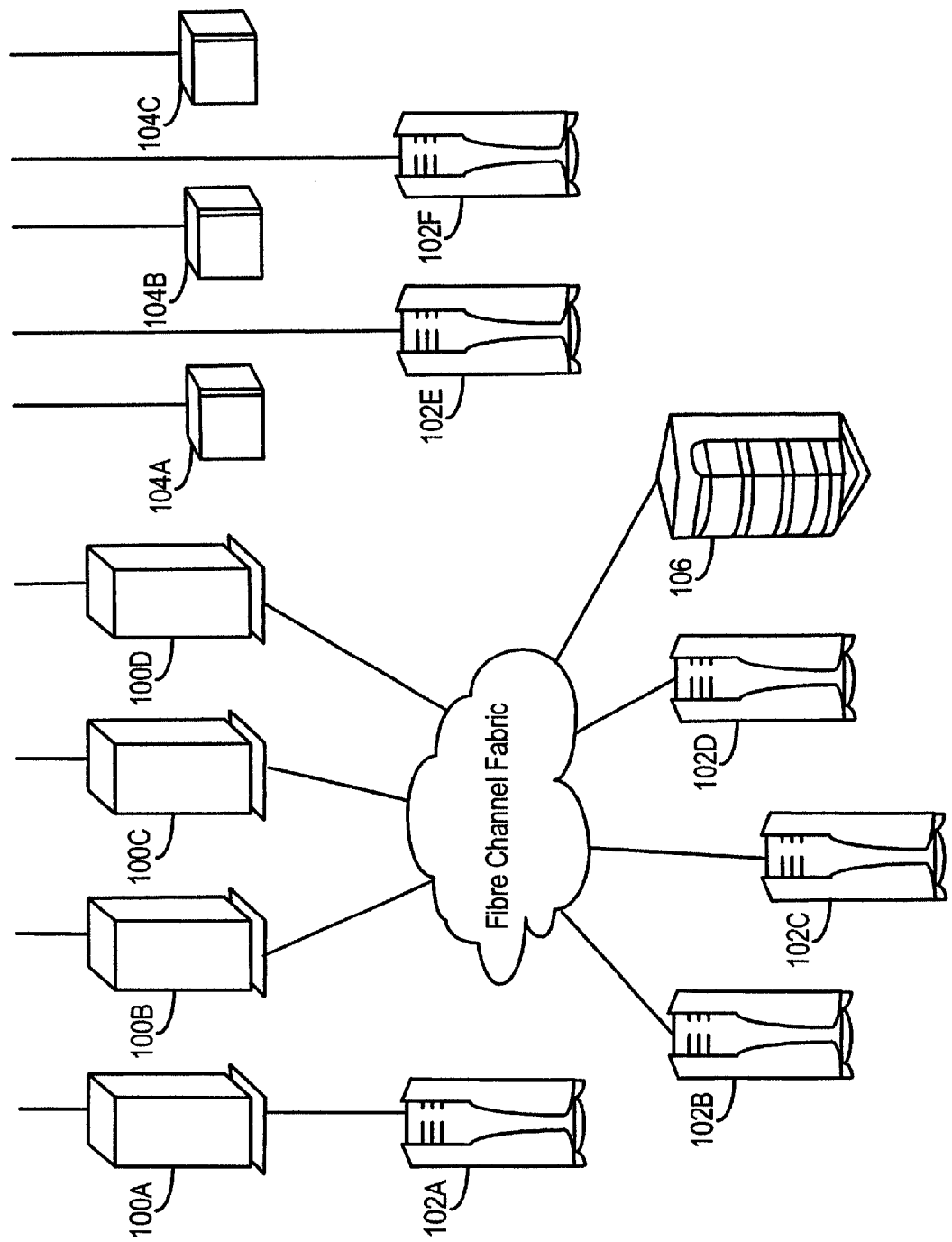
FIG. 1 illustrates a variety of uses for intelligent storage area network servers.

FIG. 1 illustrates a variety of uses for intelligent storage area network (ISAN) servers. A storage area network (SAN)

can be used to provide data storage services for client computers. A storage area network is optimized to provide high bandwidth and high throughput storage for client computers such as file servers, web servers and end user computers. An ISAN server, according to the present invention, provides additional functionality of card management for startup, component redundancy and component "hot swapping", all of which can reduce unscheduled down time.

FIG. 1 includes the servers 100A–D, the ISAN servers 102A–F, the thin servers 104A–C, and a storage array 106. The servers 100A–D can be UNIX servers, Windows™ NT servers, NetWare™ servers or some other type of file server.

The servers 100A–D are coupled to client computers by network links. The ISAN server 102A is coupled to the server 100A by a network link. The ISAN server 102A provides data storage services to the server 100A by performing the requested storage transactions. The ISAN server 102A is treated like a storage device by the server 100A. The ISAN server 102A is capable of holding more storage than a typical hard disk drive or hard drive array. The ISAN server 102A can be used as a storage router and provide intelligent routing among data stores coupled to the ISAN server 102A.

The ISAN server 102A also provides higher bandwidth and higher throughput processing of storage transactions than a typical hard disk drive or hard drive array. The ISAN server 102A can therefore handle the volume of demands created by multimedia data streams and other large volume data streams.

To provide the highest throughput, the ISAN server 102A may be coupled to the server 100A by a high speed network media such as a fibre channel. The servers 100B–D are coupled to client computers by network links. The servers 100B–D are coupled to a storage area network by a fibre channel fabric. The storage area network includes the ISAN servers 102B–D and the storage array 106. The servers 100B–D and the ISAN servers 102B–D support drivers for a fibre channel arbitrated loop (FC-AL).

Communication between the servers 100B–D and the storage devices over the FC-AL can be accomplished using a protocol compliant with the standard small computer system interface version 3 (SCSI-3) preferably using a fiber channel medium, also termed fibre channel protocol (FCP) (e.g., SCSI-X3T10 and FCP X3.269-199X). In other embodiments, protocols such as the Internet Protocol are used over the fibre channel fabric 108 carrying storage transactions in a variety of protocols. In some embodiments, the ISAN server 102A supports multiple protocols.

The thin servers 104A–C are coupled to clients by network links, but in this example, thay are not using storage area networks to provide data storage.

The ISAN servers 102E–F are directly coupled to clients by network links. There is no intermediate server. The ISAN servers 102E–F may provide application specific processors (ASPs) that provide functionality such as file servers, web servers, and other types of processing.

An Intelligent Storage Area Network Server

Figure 2:
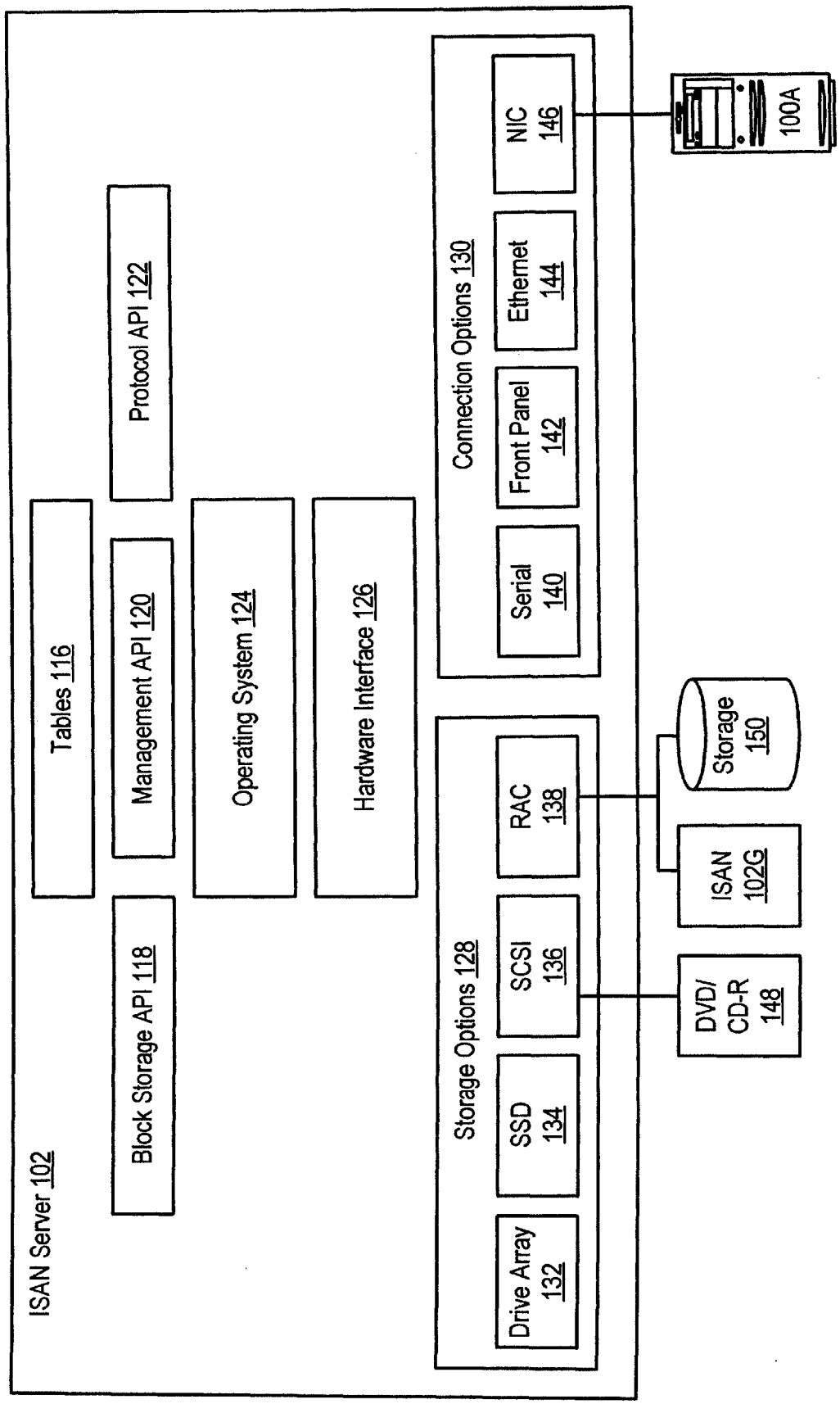
FIG. 2 is a block diagram of an intelligent storage area network server.

FIG. 2 is a block diagram of an ISAN. The ISAN server 102A has connection options 130 including a set of communication interfaces adapted for users and for other data processing functions, and storage options 128 including a set of communication interfaces adapted for storage devices. The ISAN server 102A has a hardware interface 126, an operating system 124, a block storage interface 118, a management interface 120, and a protocol interface 122. The connection options 130 include serial connections 140, a front panel connection 142, an Ethernet connection 144, and a network interface 146. The storage options 128 includes the drive array 132, the solid state drive (SSD) 134, the SCSI interface 136, and the network interface 138. The SCSI interface 136 is coupled to a DVD/CD-R 148. The network interface 138 is coupled to an ISAN server 102G and storage 150.

The connection options 130 are various methods of connecting servers and clients to the ISAN server 102A. The serial connections 140 support network management, modems for remote management, and uninterruptible power supply messages. The front panel connection 142 supports a management connection with the front panel display of the ISAN server 102A. The Ethernet connection 144 supports an Ethernet interface for management protocols and for data transfer. The network interface 146 is one of potentially many high speed interfaces on the server. In some embodiments, the network interface 146 is a fibre channel interface with drivers for a fibre channel arbitrated loop (FC-AL). The network interface 146 may also include drivers for SCSI-3 over the fibre channel medium using fibre channel protocol (FCP).

The hardware interface 126 provides interface specific hardware components. For example, the network interface 146 has a network interface specific set of software modules to support configuration, diagnostics, performance monitoring, and health and status monitoring.

The operating system 124, the tables 116, and the interfaces 118–122 support the virtual device and storage routing functionality of the ISAN server 102A. These components of the ISAN server 102A route storage transactions among appropriate storage options 128 and the connection options 130 using configured sets of driver modules in the system.

The operating system 124 provides message routing and transport facilities in addition to fail-safe facilities. The message routing and transport facilities of the operating system 124 are used to route messages, including storage transactions, between the components of the ISAN Server 102B. These messages include message in the internal format between components of a virtual circuit. These messages can also include control messages in other formats.

The block storage interface 118 provides software modules to support block data transfers. The interface 118 includes support for striped data storage, mirrored data storage, partitioned data storage, memory cache storage, and RAID storage. The different supported storage types can be linked to form various combinations such as a mirrored data storage with a memory cache.

The protocol interface 122 provides software modules for translating and responding to requests in a variety of protocols. One set of modules is provided for the layers of an Ethernet connection: the hardware driver, the data link driver, the Internet protocol (IP) driver, the transmission control protocol (TCP) driver, the user datagram protocol (UDP) driver, and other drivers. Another set of modules provides drivers for FCP.

The management interface 120 provides software modules for managing the ISAN server 102A. The management interface 120 contains interfaces for making archives and backups, interfaces for supporting the front panel display, and interfaces for managing access to the tables 116. The management interface 120 also contains interfaces for rules based management of the system including: scheduling, or process orchestration; monitoring the system; informed consent management; and handling system processes and events. The informed consent management module is premised on providing rules based management suggestions for configuring and maintaining the ISAN server 102A.

Hardware Architecture Overview

Figure 3:
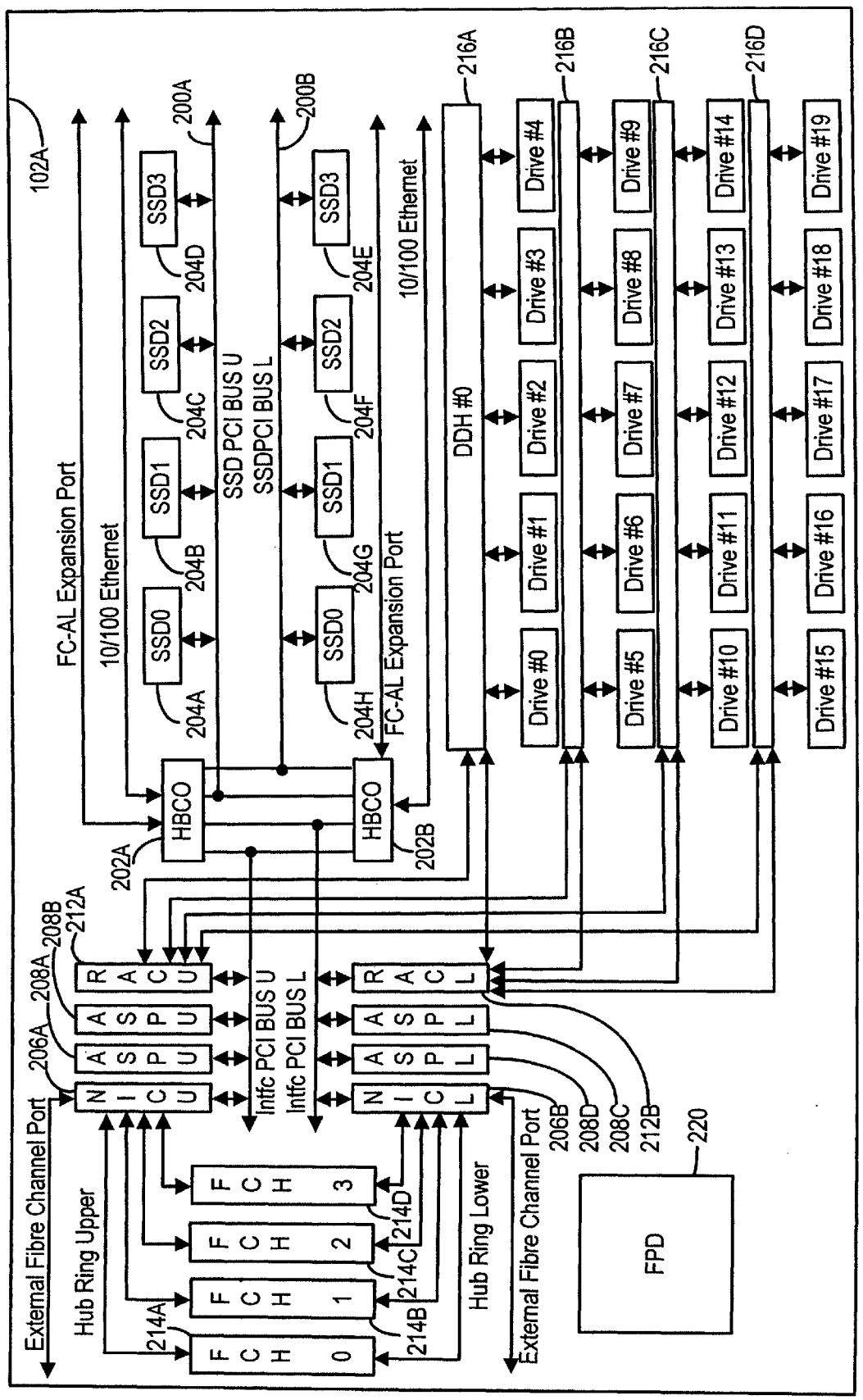
FIG. 3 is a block diagram of the hardware architecture of an intelligent storage area network server.

FIG. 3 is a block diagram of one suitable hardware architecture of an intelligent storage area network (ISAN) server. The hardware architecture implements redundancy and supports distributed software systems to prevent any one single point of failure from interfering with a particular storage transaction.

FIG. 3 includes the ISAN server 102A. The ISAN server is designed to provide a high degree of redundancy while using standard components and the standard based devices. For example, the ISAN server 102A uses a high speed version of the standard peripheral component interconnect (PCI) implementation and standard fibre channel arbitrated loop (FC-AL) interfaces. A variety of other protocols and interfaces can be used in other embodiments.

The ISAN server 102A has four separate 64-bit 66 MHz PCI busses 200A–D. Many different configurations of storage devices and network interfaces in the slots of the PCI busses are possible. In one embodiment, the PCI busses are divided into two groups: the SSD PCI busses 200A–B and the interface PCI busses 200C–D. Each group has two busses that are designated by the terms upper and lower. The upper and lower busses in each group can be configured to provide redundant services. For example, the lower SSD PCI bus 200B has the same configuration as the upper SSD PCI bus 200A.

The PCI busses 200A–D are connected to host bridge controller (HBC) modules 202A–B. The HBC modules 202A–B span the PCI busses 200A–D and provide redundant bridging paths.

The SSD PCI busses 200A–B support solid state drive (SSD) modules 204A–G. The SSD modules 204A–G provide solid state storage devices such as a flash memory store.

The interface PCI busses provide an interconnection from the network interface controller (NIC) modules 206A–B, the redundant arrays of independent disks (RAID) Controller (RAC) modules 212A–B, and application specific processing (ASP) modules 208A–D to the HBC modules 202A–B. In an alternative embodiment, NIC and RAC functions may be combined in a single module.

In addition to coupling the ISAN server 102A to the external FC-AL, the NICs 206A–B can be coupled to fibre channel hub (FCH) modules 214A–D. Each FCH module 214A–D is coupled to both NIC modules 206A–B. Each FCH module 214A–D provides ten FC-AL ports, and can be cascaded through the NIC modules 206A–B to provide a twenty station FC-AL hub.

The disk drive hub (DDH) modules 216A–D provide a redundant FC-AL fabric to connect disk drives to the RAC modules 212A–B. The FC-AL fabric in each of the DDH modules 216A–D comprises two redundant loops, which couple all of the drives attached to the DDH module with both RAC modules 212A–B. The RAC modules manage a loop among all of the DDH modules 216A–D. The DDH modules 216A–D each support five dual-ported disk drives such as the disk drive 218.

The system mid-plane (SMP) is not depicted in FIG. 3. The SMP is a passive mid-plane that provides the interconnections shown in FIG. 3 between the HBC module 202A–B, the SSD modules 204A–H, the RAC modules 212A–B, the NIC modules 206A–B, the FCH modules 214A–D, the DDH modules 216A–D, and the ASP modules 208A–D. The SMP is compact PCI based, with four custom compact PCI busses 200A–D, RAC-DDH interconnections, and NIC-FCH interconnections and miscellaneous control busses comprising the mid-plane signals. In addition, the SMP provides power distribution from the power subsystem, not depicted in FIG. 3, to the modules, at voltages of 48V, 12V, 5V, and 3.3V.

The front panel display (FPD) 220 provides a user interface for the ISAN server 102A. The FPD contains a display device and an input device. In one embodiment, a touch sensitive liquid crystal display (LCD) is used to present a touch sensitive screen with input capabilities. The FPD 220 is coupled to the HBC modules 202A–B to support status displays, configuration display and management, and other management functions.

Power and fan subsystems, not depicted in FIG. 3, provide redundant AC to DC power supplies, redundant DC to DC power conversion, battery backup for power down, and a redundant push-pull fan subsystem. These components support the high availability and low down time features that are important when a storage area network is deployed.

The ISAN server 102A can be coupled to other ISAN servers to appear as a single network port in a storage area network or as a network attached storage device. This coupling can be done over the FC-AL expansion ports that are coupled to each of the HBC modules 202A–B. Additionally, the HBC modules 202A–B offer RS232 serial ports and 10/100 Ethernet ports for out-of-band management.

The bus system includes all of the buses in the ISAN server 102A. In this example, the bus system includes the four PCI buses interconnected by the host bridge controllers. The bus system also includes the PCI buses internal to the HBC modules that provide additional interfaces. The slots include all of the positions on the bus system which can receive interfaces. In this example, each of the four PCI buses outside of the HBC modules can accommodate four interfaces.

The interfaces are the cards or other devices that are placed in the slots. The interfaces support drivers and hardware for the data stores coupled to the interfaces.

Redundancy and Fail-Over

The ISAN server 102A offers a high degree of redundancy. In one embodiment, there are redundant NIC, RAC, and HBC modules. The SSD modules and drives support mirroring. The drives also support parity and dual channel access. Each DDH module contains a fully redundant FC-AL fabric for connection to the RAC modules. Fail-over is handled by the HBC modules, which control the other modules in the ISAN server. The control is multi-layered.

The HBC module's first layer of control-over is the power supply control. Each module has an individual power supply enable signal that is controlled by the CMB controller on the module. Although the HBC modules are redundant, only one HBC module will serve as the master HBC module and direct and control the system. The other HBC will act as a slave.

When a module is plugged into a slot, its power supply is initially disabled. Only the master HBC module can enable the power supply. If a module begins to perform improperly and does not respond to commands, the module HBC module can disable the power supply to the module.

The second layer of control for the HBC modules is the card management bus (CMB), which is discussed in further detail below. Each module has an Atmel AT90S8515 (AVR) microcontroller that is coupled to the CMB. The HBC module itself has an AVR microcontroller 316 coupled to the CMB that can be active or passive, or can act as a master or as a slave. The CMB microcontroller is powered by a connection to the mid-plane independently of power supplied to the main processor on the module. The CMB allows the master HBC to read a card type, determine if a card is present, send a non-maskable interrupt to a card or perform a hard reset of a card. Module processors and the master HBC module can also perform communication through a serial port on the AVR microcontroller on the module. This communication path can be used as a backup in the event of a PCI failure.

The third level of control for the HBC modules is the PCI bus. $I_2O$ type messaging is used to keep track of module status and to ensure module performance. If a module does not respond, it can be queried via the CMB. If the module still does not respond, a non-maskable interrupt can be set via the CMB. If the module still does not respond, it can be reset via the CMB. If after reset, the module still does not respond, it can be powered down and a warning can be issued to replace the module.

CMB Hardware Architecture Overview

Figure 4:
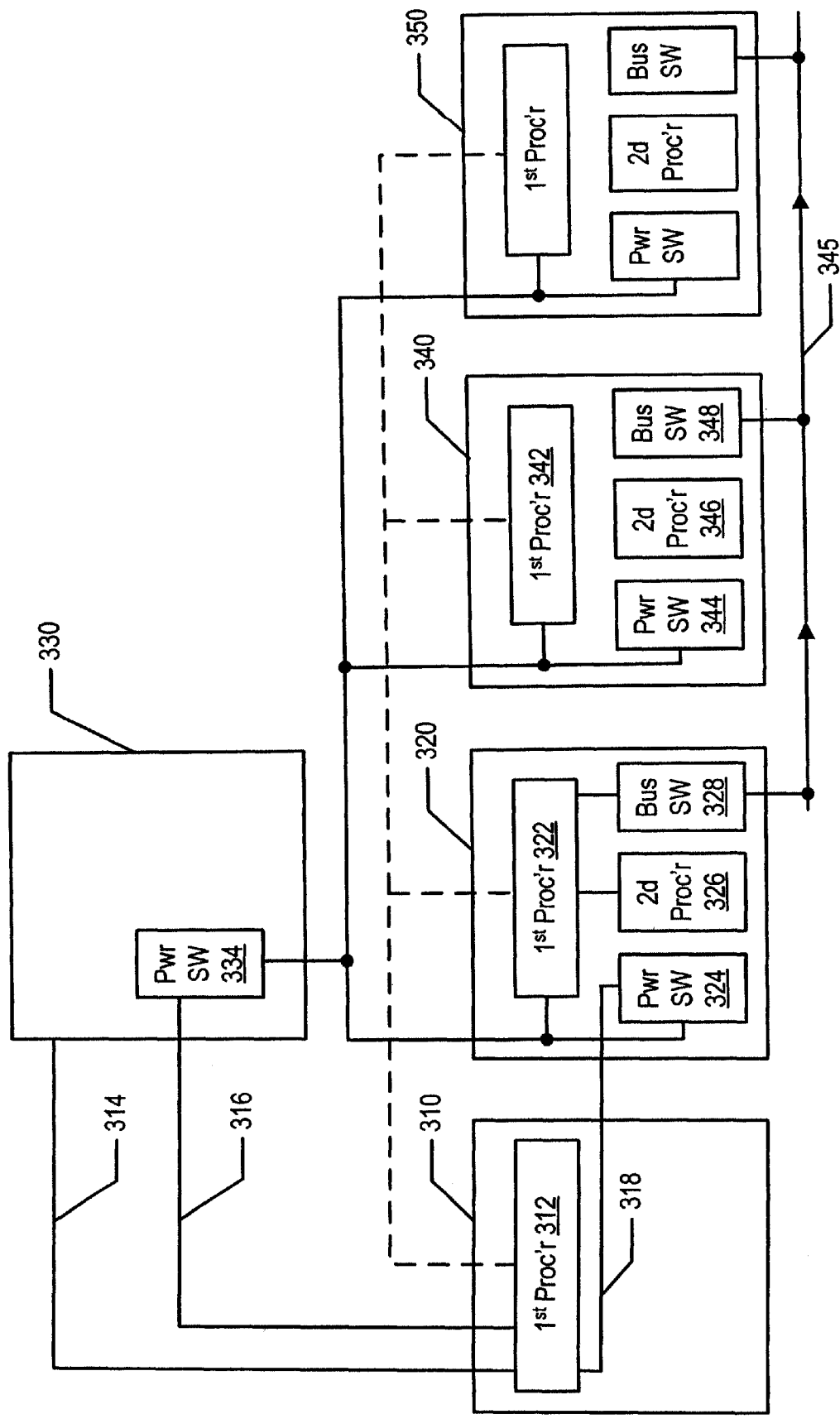
FIG. 4 is a block diagram of the controllers, processors, busses and other components related to a card management system.

FIG. 4 is a block diagram of one suitable hardware architecture for a card management bus system. This hardware implements and supports redundancy. It supports management of system startup, system monitoring, and component "hot swapping." Erratic startup or failure of a component can be detected and prevented from interfering with storage transactions.

In FIG. 4, the first controller 320 includes a first processor 322, a power switch 324, a second processor 326 and a bus switch 328. The first controller may be referred to as the host bridge controller (HBC). The first processor is coupled with the second processor and the bus switch. In one embodiment, the first processor is an Atmel AT90S8515 microcontroller clocked at approximately 3.7 MHz, also referred to as an AVR or CMA processor. The first processor communicates with the second processor responsive to messages received across the first bus 325. The first processor is coupled with the bus switch, which enables or disables an interface between the second processor 326 and a second bus 345.

In a preferred embodiment, the first bus may include five lines for redundant serial communication. A first line signals which of the remaining lines are in use. The second and third lines are alternate lines for transmitting messages. The fourth and fifth lines are alternate lines for receiving messages. Also in a preferred embodiment, the second bus may include one or more 64 bit wide parallel busses compliant with the PCI standard.

The second controller 310 includes a first processor 312 which is coupled by lines 314 and 316 to a power supply 330. The second controller referred to as the environmental controller (EVC). It is also coupled by line 318 to the power switch 324 of the first controller.

The power supply 330 includes transducers and power and fan modules, preferably redundant, which are not depicted. These transducers may report on AC power availability, whether AC power is within voltage limits, the charge level of a battery backup, the temperature of the power supply and the operation of the fans. Responsive to status signals from the transducers included in the power supply, the second controller may enable power switch 334 to provide a supply of power 335. Preferably, the supply of power will be enabled when two or more power and fan modules are available. The power and fan modules may be considered available when AC power is available and within voltage limts, the battery backup is charged, the operating temperature of the power supply is reasonable, and the fans are operating. The supply of power is coupled to the first, CMA processors of the first controller and the IOPs, allowing them to power on without further switching. This supply of power also is coupled through additional power switches, such as 324, to power certain components of the first controller 320 and input-output processors 340 and 350. In one embodiment, this supply of power is part of the passive mid-plane which is discussed above.

The second controller 310 signals the power switch 334 in the first controller through line 318 to enable or disable power to certain components of the first controller, such as the second processor 336. The second processor in one embodiment is a MIPS CPU RM7000.

Input-output processors (IOPs) such as 340 and 350 are coupled with the first controller 320 by the first bus 325. These IOPs preferably include a first processor 342 which is coupled to a power switch 344, a second processor 346, and a bus switch 348. The bus switch controls access to the second bus 345. In IOPs, the first processor 342 may enable or disable the power switch 344 and the bus switch 348 in response to messages received across the first bus 325. The first processor also communicates with the second processor 326, responsive to messages received across the first bus 325. An IOP may also be connected to additional or different busses, such as a fibre channel-arbitrated loops (FC-AL).

FIG. 5A illustrates a fixed record format for messaging across the first bus 325. In this fixed format, there are six fields. Preferably, bytes of data in this fixed format include nine bits. In this format, the ninth bit can be turned on to signal that a byte is the first byte in a message. Otherwise, the ninth bit is turned off. The first field 410 indicates the destination of a message. The second field 415 indicates the source of the message. The third field 420 contains a code for a request or command or response. The fourth field 425 contains various status flags illustrated in FIG. 5B. The fifth field 430 contains a count of the number of data bytes to follow, not including message integrity information. The sixth field 435 contains message integrity information, such as an eight bit cyclic redundancy check (CRC) value, which preferably is generated by a table look-up. A CRC value or similar checksum confirms the integrity of messages sent across the first bus. When the value in the fifth field 430 is greater than zero, the seven and eighth fields are part of the message. The seventh field contains data. In a preferred embodiment, no more than 24 bytes of data are transmitted with any message. For data that spans multiple messages, the first part of the fifth field is sequence number, which is followed by bytes of actual data. Otherwise, the fifth field 450 contains a number of data bytes corresponding to the count given in the fourth field. The eighth field contains additional message integrity information.

FIG. 5B illustrates status flags for messaging. The low order flag "CMD/RSP" is set to "1" if the packet includes a command and to "0" if the packet is a response, not including a command. The meaning of the "ACK/NAK" bit depends on whether the packet is a response or command. For response packets, this bit set to "1" if the packet is an acknowledgement (ACK), in which case the data field contains response data. This bit is set to "0" if the packet is a non acknowledgement (NAK), in which case the data field contains the not acknowledged reason code. For command packets, this bit is set to "0". The "MIPS SRC" bit is set to "1" if the header SRC address refers to the location of the second MIPS processor, indicating that responses should be forwarded by the first CMA processor to the second MIPS processor. The bit is set to "0" if hevrs he and therc slot originated the packet." The "MIPS DST" bit is set to 1 if the header DST address refers to location of the second MIPS processor. It is set to "0" if the AVR in the DST slot is the target of packet. In a command packet, this bit is set to "1" to indicate that the packet should be forwarded to the destination second MIPS processor as an unsolicited packet. If this bit is set to "1" in a response packet, it means of the response is answering a command in which the "MIPS SRC" bit was set to 1. The "CMD AVAIL" bit is used in response to a status polling message. It is set to "1" in response paying packet to indicate that a first processor has data waiting to sent. Otherwise is set to "0". For request packets, this bit is set to "0." The "DATA AVAIL" bit is also used in response to status polling messages. It is set to "1" in a response packet to indicate that a first processor has a command waiting to be sent. Otherwise, it is set to "0". For request packets, this bit is set to "0".

Messages and a protocol for messaging across the first bus 325 are illustrated in FIGS. 6A, 6B, 7A and 7B. These messages and protocol permit the CMB system, under management of the first controller, previously identified as the active or master HBC, to: control the power up sequence; poll to discover added or failed boards; monitor environmental sensors; control environmental actuators; supply or remove power to second, MIPS processors on IOPs; control IOP access to the second, PCI bus; and control removal or replacement of IOPs and controllers. IOPs and controllers preferably are contained in a rack mountable chassis. As depicted in FIG. 3, field replaceable modules in a managed system may include first controllers (Host Bridge Controller (HBC) modules), second controllers (Environmental Controller (EVC) modules), Solid State Drive (SSD) modules, Network Interface Controller (NIC) modules, RAID Controller (RAC) modules, and Disk Drive Hub (DDH) modules. Each of these modules has a Card Management Agent (CMA) micro-controller, previously referred to as a first processor, which is coupled with the first, CMB bus. Preferably, there are redundant first controllers, only one of which is active in controlling the system. Among these module types, the HBC, SSD, NIC, and RAC modules are equipped with second, MIPS processors, which communicate with first, CMA processors. Each first processor has the capability to: determine the slot ID occupied; notify the second, MIPs processor of events; control the supply of power to the second, MIPS processor and other IOP components; control access to the PCI bus; and obtain or modify a boot block memory contained on the IOP.

When power is first applied to the managed system, the first processors on the second controllers are the only active components. One second controller is determined to be the active second controller and any others are passive. The active second controller evaluates the power supply and enables power to the system mid-plane bus. This enablement of power causes the first, CMA processors of the first controller and all other IOPs to power on.

If more than one first controller is present in the managed system, the active second controller determines which first controller will be active. The first processor on the active first controller manages communications across the first bus in accordance with a particular protocol. Particular addresses on the first bus are valid for IOPs. The first controller sends messages to each of the particular addresses and evaluates the response or non-response in order to determine whether to power on IOPs at the particular addresses. It further determines whether to enable or disable the bus switch and thereby control access by each IOP through an interface to the second bus. Bus switches in the Quick Switch® products line are well adapted for hot swap applications. Generally, 3.3V 16-bit or 32-bit bus switches for hot swap applications may be used, such as model QS32XVH245.

The FIGS. 6A and 6B illustrate messages sent out by the first controller and, in pseudo code, a processing loop by which the first controller may communicate across the first bus with first processors. Each of the messages illustrated in FIG. 6A is directed to a particular address. The following paragraph describe each command and provide sample packet layouts.

In one embodiment of the status poll message, the message and response formats are:
Command: DD SS 03 01 00 CRCO
Response: DD SS 03 ST 00 CRCO
This message is sent by the master CMA to interrogate a slave CMA. The slave CMA responds with a simple packet indicating whether it has either data or a command awaiting permission to send. These conditions are indicated by bits set within the standard packet status byte.

In one embodiment of the get command message, the message and response formats are:
Command: DD SS 04 01 00 CRC0
Response: DD SS 04 ST NN CRCO PP .. PP CRC1
This message requests a command from a slave. This command is issued in response to a Data Poll that had the Command Available bit set. This allows CMB slaves to issue commands to either the CMB master or another CMB slave. The slave responds with a packet whose data payload contains the complete command packet which it wishes to have sent. After the CMB master receives the slave's response, it sends the slave's command packet on the CMB (or to its local MIPS CPU, if so addressed).

In one embodiment of the get CMB slot status message, the message and response formats are:
Command: DD SS 05 01 00 CRC0 ID CRCC1
Response: DD SS 05 ST NN CRCO ID S2 CRC1
This message is used to obtain data from a slot status table. The slot status table is where the active CMB maintains its copy of status information retrieved from the first CMA processor on each controller or IOP coupled with the first CMB bus. The table may maintain a copy of the state code for each CMA. The parameter byte ID indicates which slot is being queried. This ID is a standard slot address at which a controller or IOP may be located. The S@ byte in the response provides the state of the identified slot.

In one embodiment of the get board information poll message, the message and response formats are:
Command: DD SS 08 01 00 CRC0
Response: DD SS 08 ST 03 CRC0 TT II FF CRC1
This command is used by a MIPS CPU to signal its local CMA that the MIPS is beginning to boot. This command is normally sent to the "Local CMA" address, since the MIPS CPU might not know its own slot address yet.

This command requests a response containing the IOP board type (TT), slot number (II) and some extra status flags (FF). Slot number is an address as described in section 3.1. The status flags byte is formatted as follows:

| Bit 7 | | | | | | | Bit 0 |
|---|---|---|---|---|---|---|---|
| 0 | 0 | 0 | 0 | 0 | 0 | Diag Boot | HBC Master | where:

The HBC Master flags indicates which HBC slot is presently selected as the master HBC (conveniently, HBC slots are zero and one, so this bit defines the full HBC slot number). The Diag Boot flag is set to one if the IOP is supposed to enter diagnostics mode, or to zero if it should proceed with a normal boot. Note that this bit will probably only be set on HBC boards, since other IOPs load their boot image from the master HBC via PCI access.

In one embodiment of the set PCI window message, the message and response formats are:
Command: DD SS 09 ST 0C CRC0 S3 S2 S1 S0 P3 P2 P1 P0 B3 B2 B1 B0 CRC1
Response: DD SS 09 ST 00 CRC0
This command is sent to an IOP to define the IOP's PCI window. This command is sent for the first processor on an IOP to pass directly to the second MIPS processor, indicated by setting the DST bit high. Because this command is being passed directly to the MIPS processor, it should not be sent until the IOP's state (in its STATUS byte) indicates that the MIPS boot has completed.

When an IOP receives this command, it must implement the desired PCI window configuration before sending a response back. A positive response to this command thus serves to inform the master that it is safe to begin loading a boot image into the target's PCI window, if the master so desires.

The set PCI window message has a packet payload that contains three four-byte PCI window parameters. The PCI window settings are all integers, and are sent in big-endian order, that is the most significant byte of the integer is at the lowest offset within the packet. All three PCI configuration integers have a least significant bit value of 2**16, so their granularity is 64 kB.

The following table lists the message parameters:

| label | value |
|---|---|
| S3–S0 | Size of PCI window to be configured. One-based count of 64 kB blocks. |
| P3–P0 | Base address of window, as seen from the PCI bus. lsb = 2**16 bytes. |
| B3–B0 | Base address of window, as mapped into target IOP's memory space. lsb = 2**16 bytes. |

In one embodiment of the set boot parameters message, the message and response formats are:
Command: DD SS 0A ST 09 CRC0 TT 13 12 11 10 P3 P2 P1 P0 CRC1
Response: DD SS 0A ST 00 CRC0

This message is used to forward the parameters (boot type, and PCI image parameters when doing a PCI image boot) necessary to start up a MIPS CPU. The parameters are sent directly to the target IOP's MIPS CPU. Thus, this message must not be sent until the target MIPS CPU has signaled its readiness by setting state "Unknown Boot Type" via the "Set MIPS State" message.

This message's packet payload contains three parameters, a single-byte boot type and two four-byte PCI boot image settings. The PCI boot image settings are integers, and are sent in bigendian order, that is, the most significant byte of the integer is at the lowest offset within the packet. They are only valid when the boot type value is "PCI". Both PCI boot image parameters have a least significant bit value of 2**16, so their granularity is 64 kB.

The following table lists the command parameters:

| label | value |
|---|---|
| TT | Requested boot type (see table below for values) |
| I3–I0 | Offset of boot image from start of IOP's PCI window. lsb = 2**16 bytes. |
| P3–P0 | Offset of boot parameters (transport info, etc.) from start of IOP's PCI window. lsb = 2**16 bytes. |

Possible values for the boot type (TT) byte are:

| code | meaning |
|---|---|
| 0 | None specified |
| 1 | Enter diagnostic mode |
| 2 | Perform PCI boot |
| 3 | Perform crash dump |

If code zero is specified, the MIPS CPU will loop indefinitely, re-reading the boot mode until some actionable boot type is seen.

In one embodiment of the set MIPS state message, the command and response formats are:
Command: DD SS 0B ST 01 CRC0 CC CRC1
Response: DD SS 0B ST 00 CRC0
This command is used to update the "State" value maintained as part of the standard STATUS byte returned by a CMA in response to the "status poll" command. CC is the new state value, with the same bit alignment as in the STATUS byte (i.e., the least significant bit is stored in bit 0 of the STATUS byte). Other bits in the CC byte are reserved, and must be set to zero.

| Bit 7 | Bit 6 | Bit 5 | Bit 3 | | | | Bit 0 |
|---|---|---|---|---|---|---|---|
| 0 | 0 | 0 | 0 | MIPS State (CC) | | | |

"Set MIPS State" Parameter Byte

In one embodiment of the set auto poll message, the message and response formats are:
Command: DD SS 0C ST 01 CRC0 EE CRC1
Response: DD SS 0C ST 00 CRC0
This message is sent by the active HBC to enable or disable automatic CMB status polling by its local CMA. This command exists in order to turn off status polling. This in turn will trigger the EVC to fail over to a second HBC (if any) in a system.

The parameter byte EE has values 0 and 1 defined. Sending a 0 means to disable auto polling, which will trigger an EVC-driven failover to the other HBC. Sending a 1 means to enable auto polling.

In one embodiment of the power on message, the message and response formats are:
Command: DD SS 10 0100 CRC0
Response: DD SS 10 ST 00 CRC0
This message is sent by the master HBC to enable power to the MIPS CPU cluster on the target IOP. The destination CMA performs the following sequence in response to this request:
1. Assert (& hold) reset to the MIPS CPU
2. Enable power to the MIPS CPU
3. Enable PCI bus access (same as PCI Enable command below) for the MIPS CPU
4. Clear the CMA's side of the CMA MIPS hardware interface logic 5. Deassert reset to the MIPS CPU At this point, the target MIPS CPU begins executing code from its boot flash, and the CMA sends its response to the CMB master. In general, the MIPS CPU's first behavior will be to contact its local CMA for boot status information. However, the CMA does not wait for this (or any other) request from the MIPS before replying to indicate successful power-on.

In one embodiment of the power off message, the message and response formats are:
Command: DD SS 11 0 00 CRC0
Response: DD SS 11 ST 00 CRC0
This message is sent by the master HBC to disable power to the MIPS CPU cluster on the target IOP. The destination CMA performs the following sequence in response to this request:
1. Assert (& hold) reset to the MIPS CPU
2. Disable PCI bus access (same as PCI Disable command below) for the MIPS CPU
3. Disable power to the MIPS CPU
After completing this sequence, the CMA sends a response packet to the master HBC.

In one embodiment of the PCI enable message, the message and response formats are:
Command: DD SS 12 01 00 CRC0
Response: DD SS 12 ST 00 CRC0
This message is sent by the Master HBC to enable the connection of the slave IOP to the backplane. The slave CMA accomplishes this, and then sends a response packet back to the master HBC.

In one embodiment of the PCI disable message, the message and response formats are:
Command: DD SS 13 01 00 CRC0
Response: DD SS 13 ST 00 CRC0
This message is sent by the Master HBC to disable the connection of the slave IOP to the backplane. The slave CMA disables the second bus interface.

In one embodiment of the reset CPU message, the message and response formats are:
Command: DD SS 14 01 01 CRC0 D0 CRC1
Response: DD SS 14 ST 00 CRC0
This message is sent by the Master HBC to change the status of the target IOP's MIPS processor's reset line. Possible values for the data byte D0 are:
D0 Action
1 Assert reset to MIPS CPU, and leave it asserted indefinitely
2 Deassert reset to MIPS CPU, allowing CPU to start executing code
3 Strobe reset to MIPS CPU, causing CPU to reboot and then start executing code (if reset was previously asserted, this command merely deasserts it).

In one embodiment of the NMI CPU message, the message and response formats are:
Command: DD SS 15 01 00 CRC0
Response: DD SS 15 ST 00 CRC0
This messages is sent by the Master to cause a non-maskable interrupt. The target CMA strobes the MIPS NMI line active, and then inactive again. This interrupt is used generate a core dump.

In one embodiment of the serial programming interface (SPI) reset enable message, the message and response formats are:
Command: DD SS 16 01 01 CRC0 EE CRC1
Response: DD SS 16 ST 00 CRC0
This message enables the SPI Reset drivers on the requested HBC. The master HBC MIPS issues this request to its local CMA in order to enable the MIPS to assert reset to one or more Atmel microcontrollers (the CMA processors). SPI reset might be asserted to disable a faulty CMA. In the more common case it is used to enable programming of the microcontroller's flash and EEPROM memories by the HBC MIPS CPU.

In one embodiment of the change HBC master message, the message and response formats are:
Command: DD SS 17 01 01 CRC0 MM CRC1
Response: DD SS 17 ST 00 CRC0
This command is used to signal the EVC that it should change the HBC master select line so that the indicated HBC board is the master. This command may be used when swapping or failing over an HBC. The command data value MM is used to select which HBC should be the master. A value of zero means HBC0, while one means HBC1.

In one embodiment of the get last value or read parameter message, there are actually two command codes for reading parameters. Code 0x20 reads the cached value of the desired parameter, while 0x21 says to read the current hardware value directly. These two codes will adjust as appropriate, so if 0x20 is used for a value which the CMA doesn't cache, a hardware read will be done instead. Similarly, if 0x2 1 is used to read a value which has no hardware register (e.g., chassis serial number) then the current software-maintained value is returned instead.

Packet formats for the two commands are identical, and are as follows. Code OxOB is used in these examples:
Command: DD SS 20 01 02 CRC0 TT NN CRC1
Response: DD SS 20 ST LL CRC0 D0 .. DN CRC1
The response LL and D0 .. DN values vary widely based on what the command TT and NN values are. The following table lists these values and their associated response formats:

| Request | | | Response | |
|---|---|---|---|---|
| DST | TT | NN | LL | Meaning |
| EVC | 1 | 0–2 | 1 | Return value of Nth Power Supply Voltage Sensor |
| EVC | 2 | 0–2 | 1 | Return value of Nth Power Supply Current Sensor |
| EVC | 3 | 0 | 1 | Return value of Temperature Sensor |
| EVC | 4 | 0–3 | 1 | Return value of Nth Fan Speed Sensor |
| IOP | 5 | 0 | 8 | Return MIPS POST results |
| any | 6 | 0 | 1 | Return the Board type (HBC, NAC, SSD, EVC, etc) |
| any | 7 | 0 | 16 | Return System Serial Number |
| any | 8 | 0 | 16 | Return Serial Number of Board |
| any | 9 | 0 | 2 | Return Board Revision Level |
| IOP | 10 | 0 | | Return board configuration table ("boot block") |

Note that several of the TT (type) codes have an NN value of "0". This means that there is only one instance of that type of parameter. For these types, NN should be set to zero as indicated, for future growth.

IOP 10 0 Return board configuration table ("boot block") Note that several of the TT (type) codes have an NN value of "0". This means that there is only one instance of that type of parameter. For these types, NN should be set to zero as indicated, for future growth.

The "EVC status" response data byte (TT=5) result has the following format:

| Bit 7 | | | | | | Bit 1 | Bit 0 |
|---|---|---|---|---|---|---|---|
| 0 | 0 | 0 | 0 | 0 | 0 | 0 | Diag Req | where Diag Req is set to one if the user turned on the system by holding the keyswitch in the power-on position for three seconds or longer, which indicates that the box should drop into diagnostic mode. Otherwise, Diag Req set to zero, which indicates normal operation is requested. The other bits are reserved and are set to zero.

In one embodiment of the set fan speed message, the message and response formats are:
Command: DD SS 22 01 02 CRC0 FF VV CRC1
Response: DD SS 22 ST 00 CRC0
This command is sent to an EVC to set its target fan speed value for a given fan. FF identifies the fan (values are 0–3), and VV is the new desired fan speed.
Note that if two EVCs are present, then the master HBC must send copies of this command to each EVC at about the same time.

In one embodiment of the set threshold message, the message and response formats are:
Command: DD SS 23 01 02 CRC0 II TT CRC1
Response: DD SS 23 ST 00 CRC0
This command is sent to an EVC to set one of its auto fan speed thresholds. II indicates which threshold, as follows:
II Threshold meaning
0 Exit air temperature at which fans are auto-forced by EVC to full speed.
1 Exit air temperature at which fans are restored by EVC to their selected fan speeds (see section 3.2.15, Set Fan Speed).
The TT temperature threshold parameter is in the native units in which the EVC reads and reports tempatures. Its values are TBD.
Note that if both EVCs are present, then the master HBC must send copies of this command to each EVC at about the same time.

In one embodiment of the set chassis serial number message, the message and response formats are:
Command: DD SS 24 01 10 CRC0 S0 S1 .. SF CRC1
Response: DD SS 24 ST 00 CRC0
This message is used to change the System Serial number stored in the destination CMA's EEPROM to the serial number in the message. The serial number is a 16 byte data field (S0, S1 .. SF).

In one embodiment of the set version status poll message, the message and response formats are:
Command: DD SS 25 01 02 CRC0 V0 V1 CRC1
Response: DD SS 25 ST 00 CRC0
This message is used to change the Firmware version number in CMA EEPROM to the version number in the message. The version number is a two byte data field.

In one embodiment of the DDM message, the message and response formats are:
Command: DD SS3001 NN CRC0 D0 S1 .. DN CRC1
Response: DD SS 30 ST 00 CRC0
This message is used as an alternate way to send a message to a DDM. In particular, this could be used when the PCI bus has failed and the OS needs to check if the board is going to come back. This message provides an "envelope" in which various CMB DDM-defined messages may be transferred. Presently expected uses include (but are not limited to):
Relaying CHAOS "un-quiesce" requests to IOPs when their bus segment is ready to resume activity
Sending error log entries from an IOP to the HBC when the IOP's PCI connection is defunct for some reason.
In one embodiment of the DDH command message, the message and response formats are:
Command: DD SS40 01 NN CRC0 D0 S1 .. DN CRC1
Response: DD SS 40 ST 00 CRC0
Disk Drive Hub commands may be sent via this command.
In one embodiment of the DDH status message, the message and response formats are:

Command: DD SS 41 ST 00 CRC0
Response: DD SS 41 01 NN CRC0 D0 S1 .. DN CRC1
Request status from the addressed Disk Drive Hub.

In one embodiment of the set drive lock message, the message and response formats are:
Command: DD SS41 ST NN CRC0 L0 L1 .. LN CRC1
Response: DD SS 41 ST NN CRC0
This message requests that the specified disk drive hub change the drive bay locking solenoid's enable status for a given drive bay.

1.1.2 Set Port Bypass
In one embodiment of the set port bypass message, the message and response formats are:
Command: DD SS 42 ST NN CRC0 P0 P1 .. PN CRC1
Response: DD SS 42 ST NN CRC0
This message requests that specified disk drive hub change the FC loop port bypass status for a given drive bay.

A processing loop for use on a first controller is illustrated in FIG. 6B. In this pseudo-code, the controller first determines whether or not it is the active first controller. If it is, then it processes messages. If not, it monitors the first bus for an extended period of inactivity, in essence, a timeout. This processing loop may be used to control the passing of messages among first processors on controllers and IOPs in the system.

The FIG. 7 illustrates, in pseudo code, a processing loop by which first processors other than the first processor in the active first controller may communicate across the first bus. During operation of the system, the first controller monitors the status of the IOPs by repeatedly issuing status poll messages to each particular address that is valid for an IOP. When an IOP fails to respond, it is assumed that the IOP has been removed from the system. If an IOP responds from an address where there previously was not any IOP, then it is assumed that a new card has been inserted.

Figure 8:
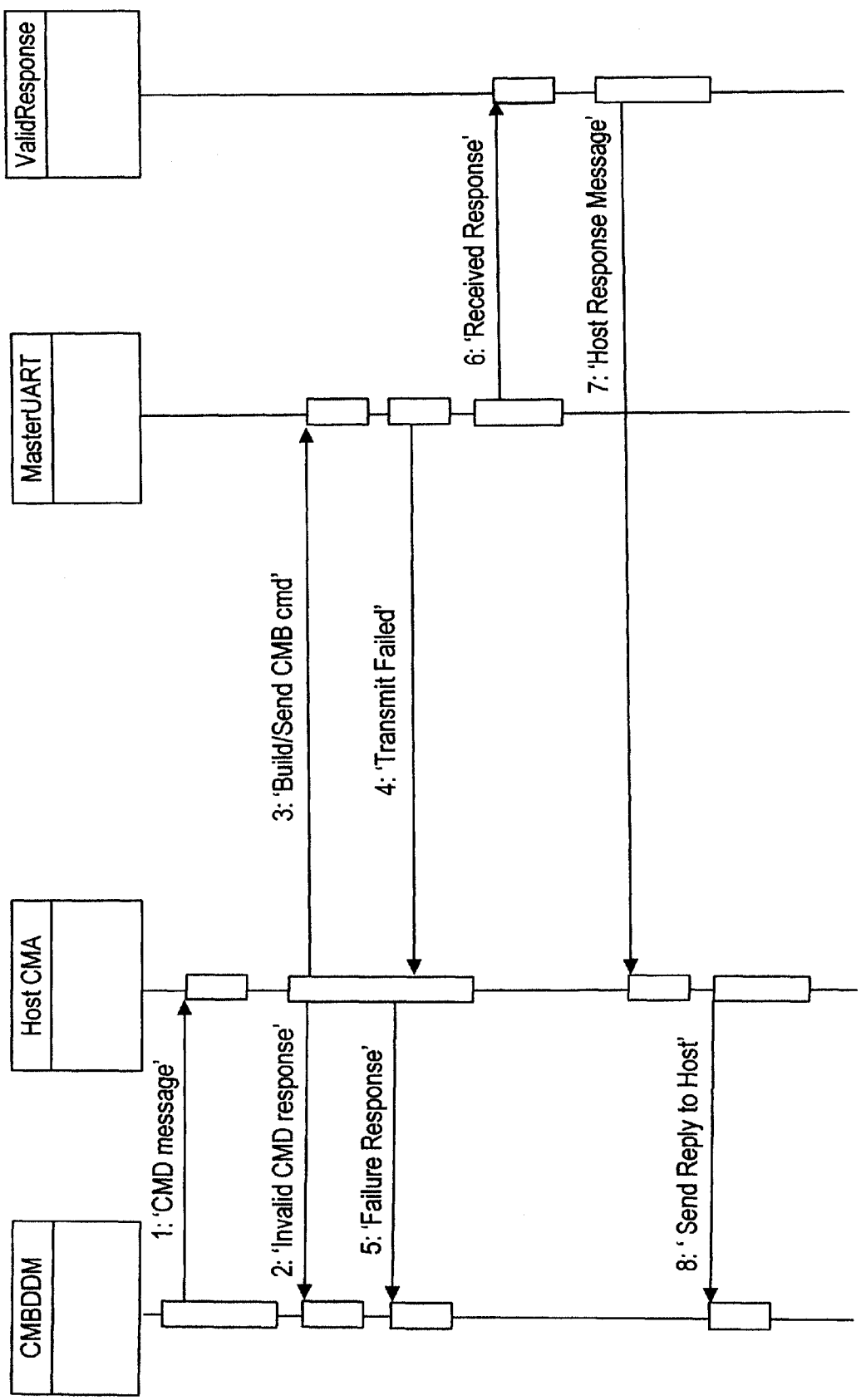
FIGS. 8 and 9 are an interaction diagram and related state diagram for the active or master first controller.
Figure 9:
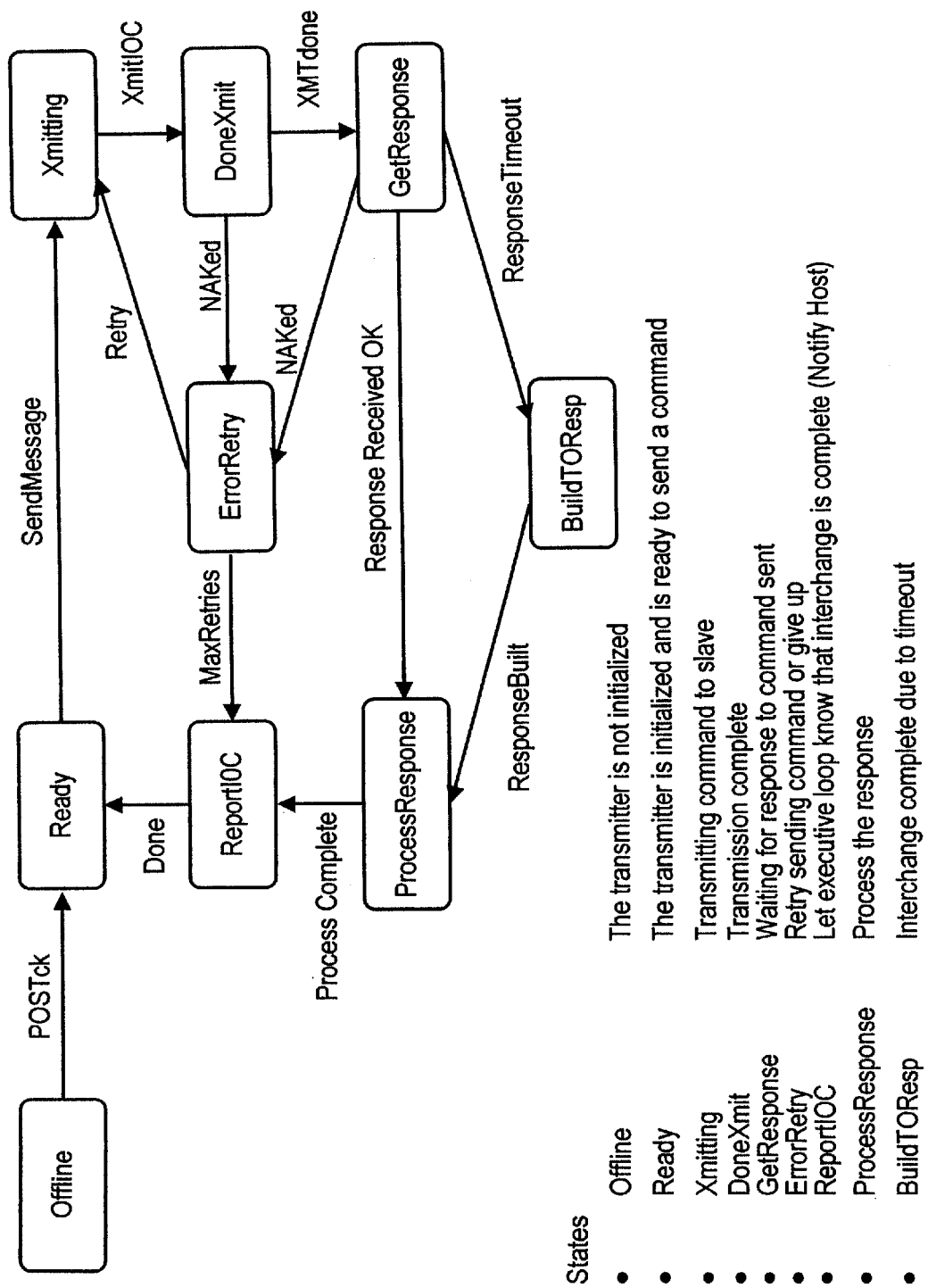

FIGS. 8 and 9 are an interaction diagram and corresponding state diagram for an active first controller communicating across the first bus. In one embodiment of the present invention, the second, MIPS processor includes logic for a card management bus device driver module (CMBDDM). The first processor is otherwise referred to as the Host CMA. A MasterUART is a hardware device coupled with the first processor that interfaces with the first bus. FIG. 8 illustrates that the second processor CMBDDM logic may transmit a CMD message to the first processor. The first processor may either return an invalid CMD response to the second processor or it may forward the message to the MasterUART for transmission on the first bus. This transmission can either fail or succeed. If it fails, a messge is returned to the second processor by the first processor. If it succeeds, a host response message is sent to the first processor which, in turn, sends a reply to host message to the second processor. Some details of this process are further illustrated by the state diagram of the MasterUART.

FIG. 9 shows that the MasterUART goes from the Ready state to the Xmitting state as a result of a valid command from the second processor. The command is processed and a packet is built. The first byte of the packet is sent from the mail loop as a result of a packet being ready. The rest of the transmission is done by the transmit interrupt service routine (ISR). The MasterUART must be ready to receive a response while transmitting the command sequence, since IOPs acting in a slave mode may send a not acknowledged, NAK message at any time. When a NAK is received, the interchange is considered complete and the transmitter and receiver are done. The UART states are controlled in both the UART interrupt service routine and in the executive loop running on the first processor. The interrupt service routine continues transmitting until transmission is complete or a NAK has been received during a transmission. In either case, the transmitter stops sending the message. If the transmission is complete, a response is expected to complete the interchange. If a NAK is received during transmission, the interchange is completed in error. When it completes in error, the first processor may retry or report the error to the second processor. As the first processor waits for a response from an IOP to complete an interchange, a timeout timer is running. If the timeout occurs before the response is received, the system assumes that the destination IOP is not functioning.

A valid response is processed and sent to the second processor. This completes the interchange and the transmitter and receiver are in the Ready state, ready to send another command. The responsive operation of the slave IOP or controller is illustrated in the additional figures.

Figure 10:
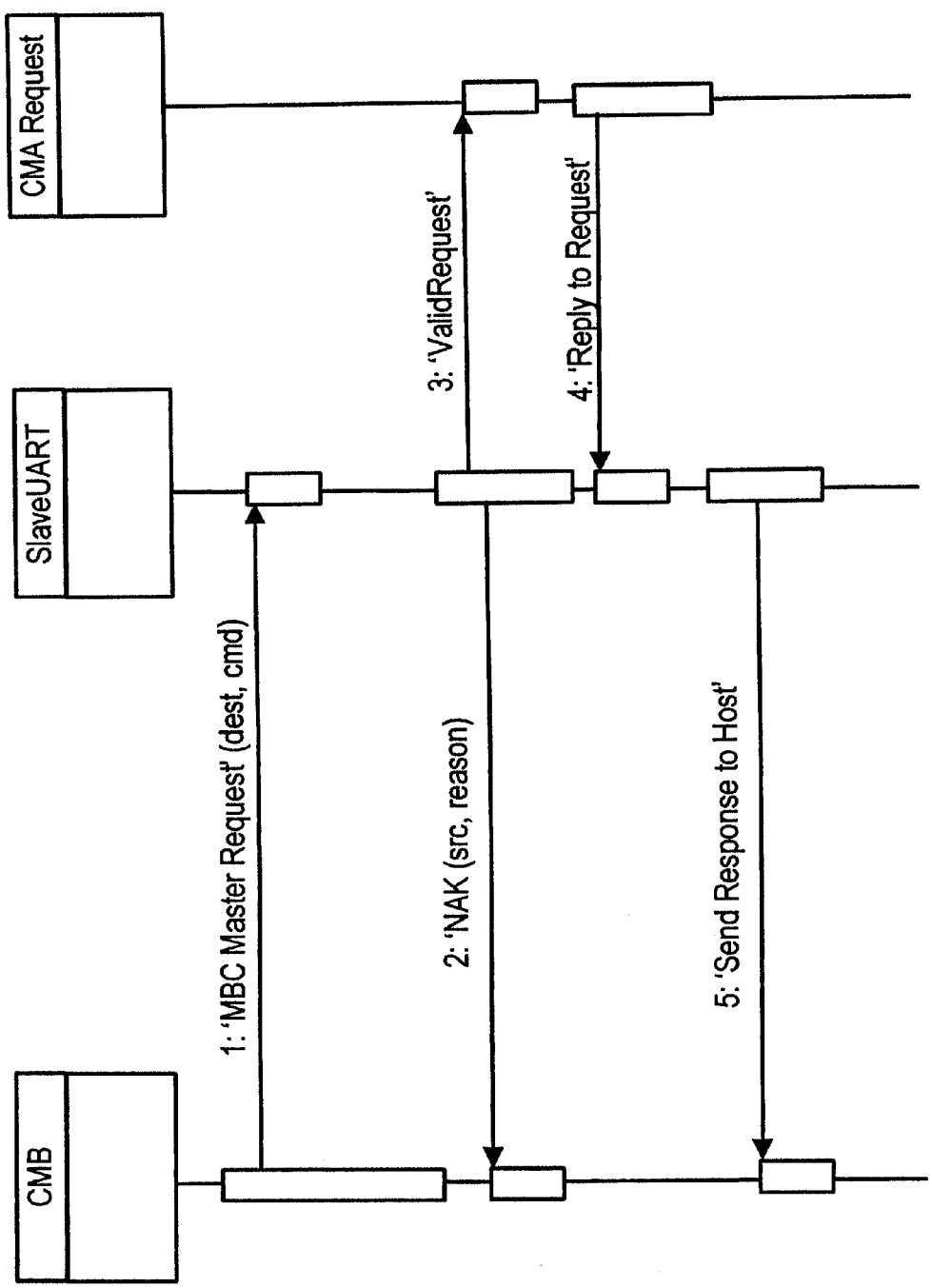
FIGS. 10 and 11 are an interaction diagram and related state diagram for an IOP, second controller, or a passive first controller.
Figure 11:
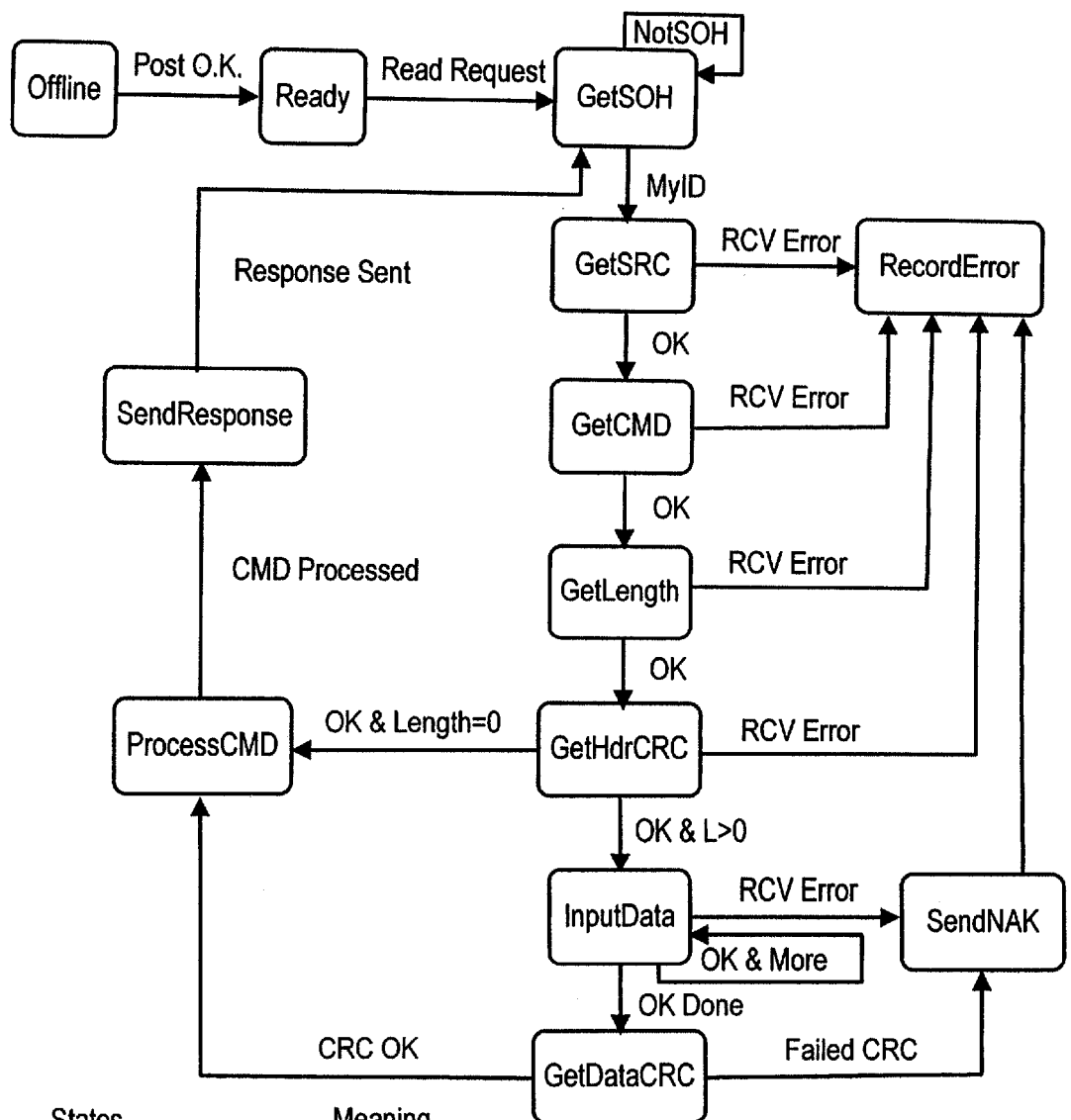

FIGS. 10 and 11 are an interaction diagram and corresponding state diagram for a slave mode IOP or controller communicating across the first bus. In one embodiment of the present invention, the first processors of IOPs and controllers other than the active first controller respond across the first bus as slaves to the master, active first controller. As shown in FIG. 10, messages come across the first bus to a SlaveUART which is connected to a first, CMA processor. The SlaveUART may either respond with a not acknowledged, NAK message or it may pass the message on to the first processor as a valid request. The first processor generates a reply, which the SlaveUART transmits across the first bus.

FIG. 11 is the state diagram for the SlaveUART, corresponding to the FIG. 10 interaction diagram. The reception of a message by the SlaveUART is interrupt driven. The receive state changes to a message complete state upon error-free completion of the message or when there is an error and the message is addressed to the SlaveUART. Messages are processed by the first processor after verifying the message integrity information, preferably a pair of CRC codes, one for the message and another for any data accompanying the message. Responses are sent back across the first bus. Transition to the reception done state is set in the interrupt service routine, but the response message is generated and sent in the exec loop.

From the description above, a number of advantages of this invention are apparent. Managed start-up and operation of a mass storage system on which numerous networked users believe that depend contributes to reliable data access without unscheduled interruption of user access. One embodiment of the present invention verifies the availability and quality of power before proceeding to power on controllers and IOP's and connected to the second bus. The availability of power may be determined by evaluating input from believe that sensors or transducers which reported whether two or more power supplies are available and detail the voltage of input AC power, the operating temperature the power supplies, and the speed and status of cooling fans. Such careful evaluation of power availability reduces the likelihood that the system will immediately shut down or malfunction due to inadequate power.

Another advantage of the present invention is that the second processors on the controllers and IOPs are powered on and stabilized before they are connected to the second data bus. Stabilizing the second processors before connecting them to the second bus avoids indeterminate broadcasting across the second bus, which may already be in use by other controllers and IOPs. The operating status of controllers and IOPs is also evaluated before those components are connected to the second bus. Failed components cannot interfere with data transfer across the second bus, because they are never connected to the second bus.

The foregoing description of various embodiments of the invention have been presented for purposes of illustration and description. The description is not intended to limit the invention to the precise forms disclosed. Many modifications and equivalent arrangements will be apparent to people skilled in the art.

What is claimed is:

1. A method of managing start-up of a system including a set of input-output processors (IOPs) which include a first processor and one or more other components, which IOPs are connected by a first bus and a second bus, the method comprising the following steps:

evaluating the status of one or more power supplies;

enabling electrical coupling of the power supplies to a first controller and to the set of IOPs, in response to the status of the power supplies;

determining in one or more steps the status of the IOPs in the set;

instructing the first processors of the individual IOPs to enable electrical coupling of the power supplies to the other components, in response to the status of the IOPs; and enabling data interfaces of the IOPs to the second bus, in response to the status of the IOPs.

2. The method of claim 1, wherein the first bus has two or more redundant lines for communication among the controllers and the IOPs.

3. The method of claim 1, wherein the first bus includes a first line for indicating which of the redundant lines are being used for communication, a second and third line for transmitting messages and a fourth and fifth line for receiving messages.

4. The method of claim 1, wherein there are two or more second controllers for evaluating the status of power supplies, further comprising, prior to the step of evaluating the status of power supplies, communicating between the second controllers and determining which second controller should be active.

5. The method of claim 1, wherein the step of evaluating the status of one or more power supplies includes determining whether two or more power supplies are available.

6. The method of claim 1, wherein the power supplies are cooled by fans and the step of evaluating the status of the power supplies includes evaluating whether AC power is available and within predetermined voltage ranges, what the operating temperature of the power supplies is and whether the fans are operating.

7. The method of claim 1, wherein there are two or more redundant first controllers, further comprising, prior to the step of determining IOP status, communicating between a second controller and redundant first controllers and determining which first controller should be active.

8. The method of claim 7, wherein the step of determining which first controller should be active includes retrieving data about the last proper operation of the system and determining whether the same second controllers are present in the system as during the last proper operation of the system.

9. The method of claim 1, wherein, the supply of power to the first processors on the IOPs is not controlled by the first controller, so that those first processors are active before the first controller determines the status of the IOPs.

10. The method of claim 1, wherein the IOPs are potentially located at particular addresses and the step of determining the status of IOPs includes the first controller sending a status request message to each particular address for the IOPs and evaluating a response or non-response from each particular address.

11. The method of claim 1, wherein the first controller communicates with the IOPs using a message format which includes in any order a first field identifying a destination for the message, a second field indicating a source of the message, a third field indicating a message type, a fourth field indicating the number of data bytes, a fifth field containing data bytes and a sixth field containing message integrity information.

12. The method of claim 1, further including the step of outputting for display from the second controller information regarding the status of the start-up.

13. A method of managing start-up of a system including two or more first controllers, one or more second controllers, and a set of input output processors (IOPs), connected by a first bus and a second bus, the method including:
    evaluating the status of two or more power supplies to determine whether two or more power supplies are available;
    enabling electrical coupling of the power supplies to the first controllers and the set of IOPs, in response to the status of the power supplies;
    evaluating the status of the first controllers;
    determining which of the first controllers should be active, in response to the status of the first controllers;
    evaluating the status of individual IOPs in the set, which include first processors, interfaces to the second bus and one or more other components;
    instructing the first processors of the individual IOPs to enable electrical coupling of the power supplies with the other components, in response to the status of the individual IOPs; and
    enabling the interfaces of the individual IOPs to the second bus, in response to the status of the individual IOPs.

14. The method of claim 13, wherein the power supplies are cooled by fans and the step of evaluating the status of the power supplies includes evaluating whether AC power is available and within predetermined voltage ranges, what the operating temperature of the power supplies is and whether the fans are operating.

15. The method of claim 14, wherein the system includes two or more second controllers, further comprising the step of communicating between the second processors and determining which of them will be active.

16. The method of claim 15, wherein the first bus has two or more lines for redundant communication among the controllers and the IOPs.

17. The method of claim 13, wherein the first controller communicates across the first bus using a message format which includes in any order a first field identifying a destination for the message, a second field indicating a source of the message, a third field indicating a message type, a fourth field containing status flags, a fifth field indicating the number of data bytes, and a sixth field containing message integrity information.

18. The method of claim 17, wherein the message format additionally includes a seventh field comprising one or more bytes of data and an eighth field containing message integrity information.

19. A system for managing input-output processors, comprising:
    a first bus;
    a second bus;
    a controller, including a first processor coupled with the first bus;
    one or more input-output processors, each including:
        a first processor coupled with the first bus;
        a bus access switch coupled with the first processor and the second bus; and
        a second processor having its access to the second bus controlled by the bus access switch; and
    logic for the controller to communicate across the first bus to the input-output processors and direct operation of the bus access switch.

20. The device of claim 19, wherein the first bus has redundant channels for communication among the controller and the IOPs.

21. The device of claim 19, wherein the first bus includes a first line for indicating which additional lines are being used for communication, a second and third line for transmitting messages and a fourth and fifth line for receiving messages.

22. The device of claim 19, wherein the second bus is a parallel data bit bus.

23. The device of claim 19, wherein the second bus comprises one or more a parallel data bit buses compliant with the peripheral component interconnect (PCI) standard.

24. The device of claim 19, in which the input-output processor further comprises:
    a power control switch coupled with the first processor and controlling the power to the second processor; and
    logic for the controller to communicate across the first bus to the input-output processors and direct operation of the power control switch.

25. The device of claim 24, wherein the first processor of the input-output processor is coupled to a supply of power which is not controlled by the first controller.

26. The device of claim 24, wherein the logic for communicating across the first bus includes using a message format which includes in any order a first field identifying a destination for the message, a second field indicating a source of the message, a third field indicating a message type, a fourth field indicating the number of data bytes, a fifth field containing data bytes and a sixth field containing message integrity information.

27. The device of claim 24, wherein the IOPs are potentially located at particular addresses and the logic includes the first controller sending a status request message to each particular address for the IOPs and evaluating a response or non-response from each particular address.

28. The device of claim 24, wherein the first processor is coupled with the second processor and the logic includes the controller having the ability to send a processor reset command to the second processor.

29. The device of claim 24, wherein the first processor is coupled with the second processor and the logic includes the controller having the ability to send a non-maskable interrupt to the second processor.

30. The device of claim 24, further comprising:
    a second controller;
    one or more power supplies with transducers coupled to the second controller which report the status of each power supply;
    a switch coupled to the second controller for controlling the supply of power to the first controller and the IOPs;
    logic for setting the switch controlling the supply of power in response to the status of the power supplies.

31. The device of claim 30, wherein the logic for setting the switch includes determining whether two or more power supplies are available.

32. The device of claim 30, wherein the power supplies are cooled by fans and the logic for setting the switch includes evaluating whether AC power is available and within appropriate voltage ranges, what the operating temperature of the power supplies is and whether the fans are operating.

33. The device of claim 30, further comprising redundant first controllers and logic for the second controller to determine which first controller should be active.

34. The device of claim 30, further comprising redundant first controllers coupled to each other and logic for the first controllers to determine which first controller should be active.

* * * * *